United States Patent
Van De Ven

[11] Patent Number: 5,889,612
[45] Date of Patent: *Mar. 30, 1999

[54] REAR POJECTION SCREEN

[75] Inventor: Johannes C. Van De Ven, Eindhoven, Netherlands

[73] Assignee: U.S. Phillips Corporation, New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 822,959

[22] Filed: Mar. 21, 1997

Related U.S. Application Data

[63] Continuation of Ser. No. 523,943, Sep. 6, 1995, abandoned.

[30]      Foreign Application Priority Data

Sep. 6, 1994   [EP]   European Pat. Off. .............. 94202547

[51] Int. Cl.$^6$ ...................................................... G03H 1/20
[52] U.S. Cl. ............................................................. 359/453
[58] Field of Search ................................. 359/14, 15, 19, 359/20, 443, 453, 456, 457, 458, 460

[56]              References Cited

U.S. PATENT DOCUMENTS

| | | | |
|---|---|---|---|
| 3,832,032 | 8/1974 | Shimada | 359/456 |
| 4,127,322 | 11/1978 | Jacobson et al. | 353/31 |
| 4,566,756 | 1/1986 | Heijnemans | 359/453 |
| 5,046,793 | 9/1991 | Hockley et al. | 359/12 |
| 5,066,099 | 11/1991 | Yoshida et al. | 359/457 |

OTHER PUBLICATIONS

"Holographic Diffusers for LCD Backlights and Projection Screens" by J.M. Tedesco et al. in SID 93 Digest, pp. 29–32.

*Primary Examiner*—Daniel P. Malley
*Attorney, Agent, or Firm*—Leroy Eason

[57]                ABSTRACT

A rear projection screen is described, which comprises an optically transparent plate, a first surface of which is provided with a structure of juxtaposed cylindrical lenses which extend in a first direction and a second, opposite surface intended to be directed towards an audience space is provided with strips of a light-absorbing material. These strips also extend in the first direction. On the second surface the plate comprises diffusing means which are formed by a single element by means of a hologram, which element diffuses the light simultaneously in the first direction at a first angle and in a second direction, perpendicular to the first direction, at a second angle, the first and the second angle being different from each other.

7 Claims, 1 Drawing Sheet

REAR POJECTION SCREEN

This is a continuation of application Ser. No. 08/523,943, filed Sep. 6, 1995 now abandoned.

BACKGROUND OF THE INVENTION

1. Field of the Invention

The invention relates to a rear projection screen comprising an optically transparent plate having a first surface which is provided with a structure of juxtaposed cylindrical lenses extending in a first direction and, arranged opposite thereto, a second surface which is intended to be directed towards an audience space and is provided with first, light-absorbing strips also extending in the first direction, said plate comprising diffusing means on the second surface.

The invention also relates to an image projection device comprising such a rear projection screen and to a method of manufacturing such a screen.

2. Discussion of the Related Art

When projecting an image in an audience space, the aim is to give the image formed on a projection screen a homogeneous and large brightness in a limited part of the audience space, viz. only in the space where the audience is present. In this way the available radiation energy can be optimally utilized for the image observed by the audience. The part where the audience is present is, however, a relatively limited part and has different dimensions in the vertical and horizontal directions. In the horizontal direction the viewing angle should be as large as possible, whereas the vertical viewing angle is generally much smaller. To realise the different viewing angles, the image projection screen may be provided with means which ensure a horizontal spread and means which ensure a vertical spread of the light.

A rear projection screen of the type described in the opening paragraph is known from U.S. Pat. No. 3,832,032. The projection screen described in this Patent has a structure of juxtaposed cylindrical lenses extending in the vertical direction on the surface facing the projector. The cylindrical lenses focus the signal light from the projector into focal lines on the surface directed towards the audience space. The surface directed towards the audience space is provided with first strips of light-absorbing material outside the focal lines formed by the lens structure and ensures the spread of light in the horizontal direction. Since the signal light is concentrated by the cylindrical lenses in the spaces between the light-absorbing strips, this light is thus substantially not subjected to absorption by the strips, while a large part of the ambient light in the audience space is absorbed by these strips and is thus suppressed. An image having a considerably high contrast can be realised in this way.

The surface directed towards the audience space is roughened in the areas between the strips of light-absorbing material in order to diffuse the incident light from the lens structure into the audience space. This is realised by providing a large number of scratches or microgrooves parallel to each other. Dependent on the orientation of the longitudinal axes of the grooves, there is diffusion in the horizontal and the vertical direction so that the spread in the horizontal direction is ensured by the combination of the lens structure and the grooves, while the spread in the vertical direction is ensured by the grooves only. However, U.S. Pat. No. 3,832,032 explicitly prefers orientation of the grooves in such a way that light is predominantly diffused in the direction perpendicular to the direction in which the lens structure diffuses light, notably in the vertical direction.

A drawback of the known projection screen is that two separate elements are required for the desired spread of light in the horizontal and vertical directions, which elements must diffuse light through different angles if a screen is desired whose diffusion has a given asymmetry Since the grooves are provided by means of sandblasting in the known screen, it is further relatively difficult to accurately adjust the diffusion angle of the grooves. In fact, the diffusion angle is determined by the orientation of the plate to be sandblasted with respect to the jet with which sandblasting is carried out. Moreover, the vertical direction, i.e. the direction in which the grooves diffuse, is exactly that direction in which it is most important to control the diffusion so as to obtain an optimum radiation distribution in the audience space.

It is to be noted that diffusers in the form of spherical particles are known which ensure diffusion of light simultaneously in the horizontal and vertical directions. However, this has the drawback that the diffusion is circularly symmetrical so that extra measures will still have to be taken when a different viewing angle in the vertical and horizontal direction is desired.

SUMMARY OF THE INVENTION

It is an object of the invention to provide a rear projection screen in which an optimum distribution of the projected light is achieved in the audience space, while the above-mentioned drawbacks are obviated, which screen also has a high contrast and can be manufactured in a simple manner.

To this end the rear projection screen according to the invention is characterized in that the diffusing means are constituted by a unitary element in the form of a diffusing hologram having seconds strips each of which simultaneously has a diffusing effect over a first angle in the first direction and over a second angle in a second direction, perpendicular to the first direction, the first and the second angle being different from each other.

A hologram is an interference pattern obtained, for example, by means of an interfering object beam and a reference beam.

A holographic diffuser is obtained by an object beam emitted by a conventional diffuser. In principle, the holographic diffuser is an image of a speckle pattern obtained with an optical interference system in which conventional scattering diffusers are incorporated. The geometry of the holographic pick-up device may be chosen to be such that the speckle pattern obtained has different structures in two mutually perpendicular directions. When reconstructing the hologram thus obtained, thus when illuminating the holographic diffuser with signal light, this light in the two directions is subjected to different diffusions based on diffraction in accordance with the different structures of the speckle pattern in these directions.

In this way it can be ensured that the diffusion will become asymmetrical, for example elliptical. In practice, this means that the angle through which there is diffusion in the horizontal direction can be made larger than the angle through which there is vertical diffusion. In this way it is relatively simple to realise an optimum distribution of radiation in the audience space.

It is to be noted that the hologram may be a computer-generated hologram instead of a hologram obtained by means of interfering laser beams.

Since further light-absorbing material is provided on a large part of the surface facing the audience space, which material considerably suppresses the ambient light, images having a high contrast can be obtained.

The structure of juxtaposed cylindrical lenses on the surface of the screen directed towards the projector ensures that signal light incident on this surface and coming from the projector is focused in focal lines on or proximate to the surface directed towards the audience space.

In the known projection screen the structure of cylindrical lenses on the screen surface has the function of spreading light in a given direction. Particularly when horizontal spread is concerned, the lenses should be relatively powerful because a relatively large horizontal viewing angle is generally desired. To realise this spread, the optically transparent plate should be relatively thin. Since the cylindrical lenses in the projection screen according to the invention do not have the function of diffuser in this case, but must only concentrate the signal light in the proximity of the surface directed towards the audience, because the second strips ensure the complete diffusion, it is sufficient to use relatively weak lenses and the optically transparent plate may be relatively thick. This contributes to the stability of the projection screen. The cylindrical lenses may extend in the horizontal or vertical direction, provided that the light-absorbing strips and the cylindrical lenses extend in the same direction.

A preferred embodiment of the rear projection screen according to the invention is characterized in that the hologram is a replica of a surface relief hologram.

In a surface relief hologram, the interference pattern is fixed as a grating in the form of a height relief of the surface. The surface has a relief structure which may be made, for example by exposing a photoresist provided on a metal plate with two interfering laser beams and by subsequently developing the photoresist and etching the plate. In this way a mold structure which may be nickel-plated is obtained, of which subsequently a copy can be made on the optically transparent plate by means of known replica methods such as, for example UV replication, injection molding or pressing. A light beam incident on this plate at a later stage will then be diffused by the hologram in the vertical direction as well as in the horizontal direction. The angles through which diffusion occurs can be varied from mold to mold by adapting the geometry of the holographic pick-up device.

The hologram structure is thus made only once as a mold and subsequently replicated on a series of plates in a relatively simple manner.

A second embodiment of the rear projection screen according to the invention is characterized in that the hologram is a volume hologram.

In a volume hologram, the interference pattern is fixed in the form of refraction variations across the thickness of the photosensitive layer. This photosensitive layer is, for example a dichromatic gelatin or a photopolymeric layer which is provided on a transparent plate. In this case the hologram itself is provided on the screen instead of as a copy of a mold. An advantage of such a hologram is that it does not have a surface structure so that it can easily be provided without risk of damage with the light-absorbing strips and can be cleaned without damage.

It is to be noted that a diffusing hologram and a volume hologram, as well as a surface relief hologram in combination with a Fresnel lens and used as a rear projection screen are known per se from the article "Holographic Diffusers for LCD Backlights and Projection Screens" by J. M. Tedesco et al. in SID 93 Digest, pp. 29–32. Such a screen diffuses the incident light with a high efficiency through a given angle, both in the vertical and the horizontal direction into the audience space. However, this screen also diffuses the ambient light incident on the screen from the audience space to the same extent and in the same direction into the audience space as the signal light. Moreover, reflections of ambient light entering the screen will occur at the air-hologram interface and at the Fresnel lens, which reflections will cause this light to reach the audience space.

Due to the above-mentioned factors, the contrast of the projected image will thus remain relatively low if the audience space is not heavily darkened.

A further embodiment of the rear projection screen according to the invention is characterized in that the thickness of the optically transparent plate and the power of the cylindrical lenses on the one hand, and the mutual position of the cylindrical lenses and the second strips on the other hand are such that the focal line of each cylindrical lens is located between two first strips at the area of or proximate to the second surface.

Since the signal light is concentrated between the light-absorbing strips, substantially no signal light will be lost due to absorption. On the other hand, ambient light is incident on the complete screen surface facing the audience space. The larger the part of the surface provided with absorbing material, the larger the quantity of absorbed ambient light. This yields images having a considerably high contrast.

A further embodiment of the rear projection screen according to the invention is characterized in that at the area of the second surface of the plate, the widths in the first direction of each light beam coming from the cylindrical lenses are substantially equal to the widths of the second strips corresponding to said lenses.

In this case the screen surface is provided with absorbing material at all those areas where no signal light is incident, while signal light is only incident at areas where there is no absorbing material. An optimum contrast can be realised in this way.

A further embodiment of the rear projection screen according to the invention is characterized in that the rear projection screen further comprises a Fresnel lens at the side of the first surface.

This lens has a converging effect and ensures that the exit pupil of the projection lens system present in the projection system is imaged in the audience space.

The invention also relates to an image projection device comprising an image projector which is provided with an image display system for modulating a radiation beam in accordance with an image to be projected, and an image projection screen, said image projection device being characterized in that the image projection screen is a rear projection screen as described hereinbefore.

An image projector is understood to mean a device which is provided with an image display system and optical means for projecting the image generated by this system on an image projection screen.

The image display system may be, for example a liquid crystal display panel (LCD) or may be formed for color image projection by three liquid crystal panels in combination with a plurality of beam-splitting and beam-recombining elements.

Instead of an LCD panel, the image display system may be a DMD (Digital Micromirror Device) panel. A DMD is an element made of a single silicon wafer comprising a matrix of deformable mirror elements. Each mirror element may tilt in conformity with a voltage applied thereto, which voltage represents the image information to be projected. In this way radiation incident on the matrix of mirror elements is reflected at different angles into or out of the projection system. Subsequently, the radiation reflected in the system is concentrated to a beam by means of an optical system and a magnified image of the DMD is formed via a projection lens system.

The image display system may alternatively be constituted by one or more cathode ray tubes provided with an electro-optical layer as described in, for example U.S. Pat. No. 4,127,322.

These and other aspects of the invention will be apparent from and elucidated with reference to the embodiments described hereinafter.

DETAILED DESCRIPTION OF THE PREFERRED EMBODIMENTS

Figure 1:
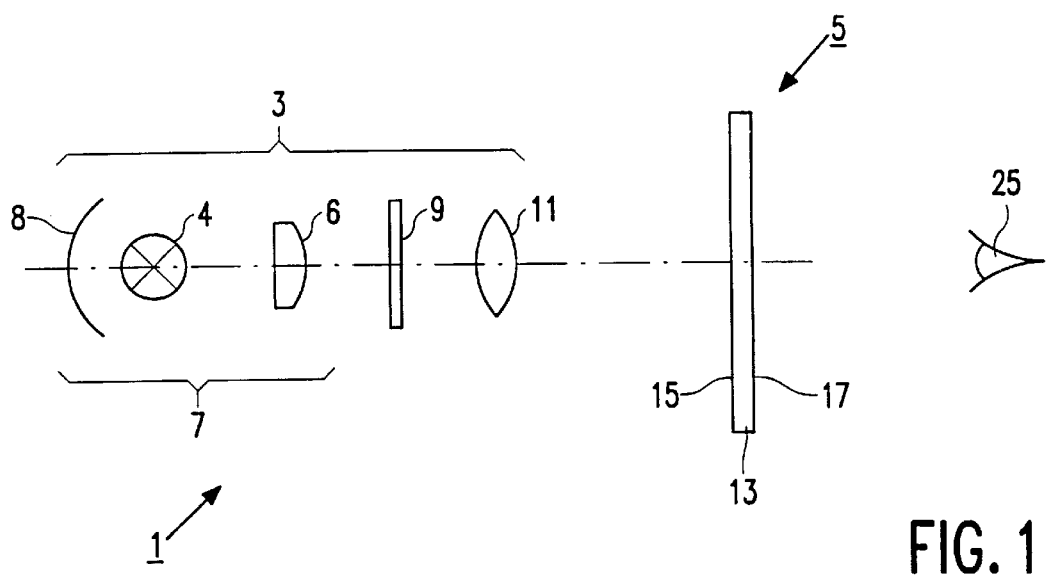
FIG. 1 shows diagrammatically an embodiment of an image projection device according to the invention.

The image projection device 1 shown in FIG. 1 comprises an image projector 3 and a rear projection screen 5. The image projector 3 incorporates an illumination system 7 comprising a radiation source 4, a reflector 8 and a condensor lens system 6 for concentrating the radiation from the radiation source 4 and reflector 8 to form an illumination beam, an image display system 9 for modulating the illumination beam in conformity with the image to be projected, and a projection lens system 11, shown by way of a single lens for the sake of simplicity, for projecting the image formed by the image display system 9 on the projection screen 5.

The image display system may be, for example a liquid crystal display panel (LCD panel) or, when color image projection is used, an assembly of three image display panels, one for each of the primary colors, and a plurality of beam-splitting and beam-recombining elements. Such an image display system requires the radiation beam incident thereon to have a given direction of polarization because the image information to be projected is added to this beam by modulating its state of polarization.

The image display system may alternatively be a DMD (Digital Micromirror Device) panel. A DMD panel is an element made of a single silicon wafer comprising a matrix of deformable mirror elements. Each mirror element may tilt in accordance with an applied voltage which represents the image information to be projected. Thus, radiation incident on the matrix of mirror elements is reflected at different angles in or next to the projection system. Subsequently, the radiation reflected in the system is concentrated to a beam by means of an optical system and a magnified image of the DMD is formed via the projection lens system. A DMD image display system does not influence the state of polarization of the incident beam, but the image information to be reproduced is derived from the angles at which the incident radiation has been reflected by the mirror elements.

The image display system may alternatively be constituted by one or more cathode ray tubes provided with an electro-optical layer.

The projection screen 5 comprises an optically transparent plate 13 having a rear surface 15 which is intended to be directed towards the image projector 3, and a front surface 17 which is intended to be directed towards an audience space 25.

Figure 2:
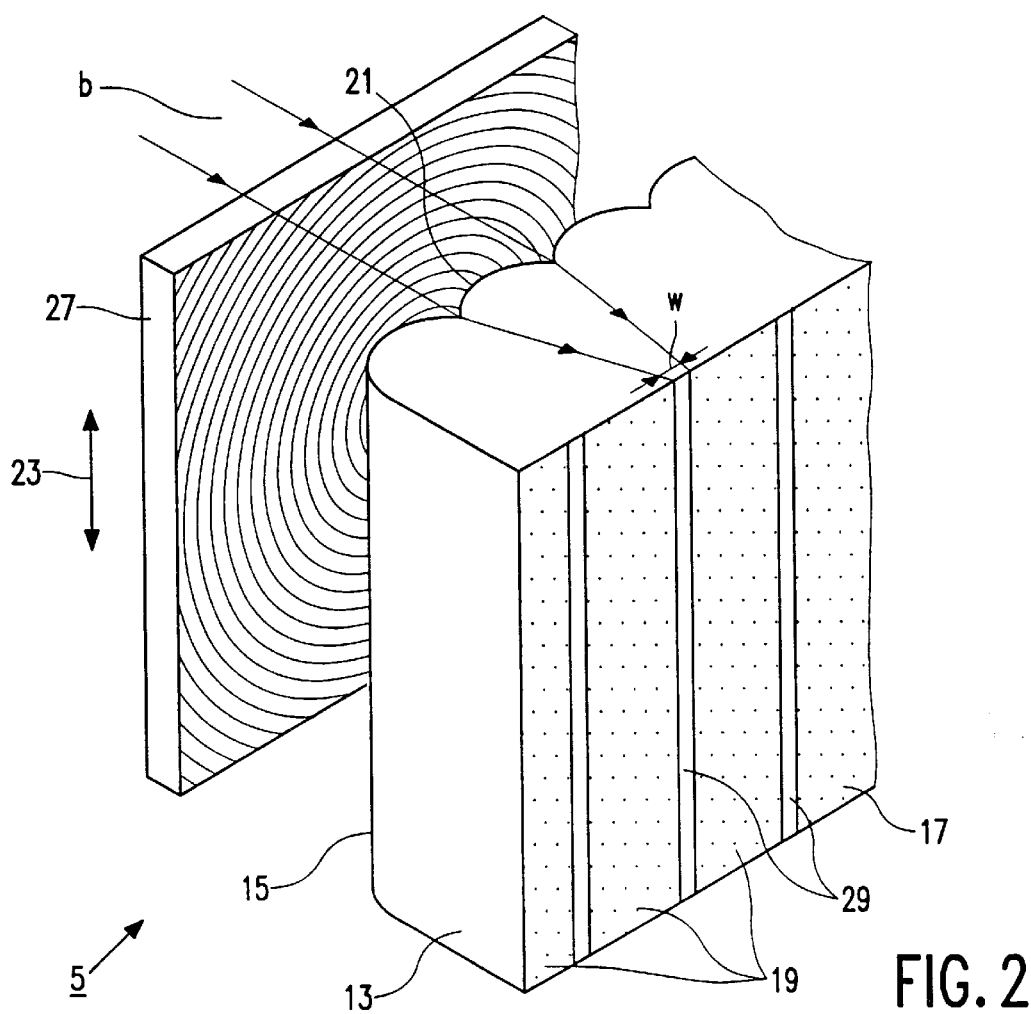
FIG. 2 shows in a diagrammatic perspective view an embodiment of a rear projection screen according to the invention.

FIG. 2 is a diagrammatic perspective view of an embodiment of the projection screen 5. The rear surface 15 has a structure of juxtaposed cylindrical lenses 21 which extend in a first direction denoted by arrow 23.

The cylindrical lenses 21 and the thickness of the screen 5 have such a curvature that a part b of the beam incident on each cylindrical lens 21, which beam originates from the image projector 3 and can be projected on the screen 5, is focused in an associated focal line which is located on or proximate to the front surface 17.

The front surface 17 is provided with strips 19 of a light-absorbing material for absorbing ambient light incident on the screen. The strips 19 extend in the same direction 23 as the diffusing cylindrical lenses 21 and are located outside the strips 29 on which radiation is concentrated by the cylindrical lenses 21. In this way, the signal light is only incident on the screen on the diffusing strips between the strips 19, while a large part of the ambient light is incident on the strips 19. If the plate 13 on the one hand and the mutual position of the cylindrical lenses 21 and the strips 19 on the other hand have such a thickness that the width w of each of the parts b of the signal beam at the area of the surface 17 corresponds to the distance between two successive light-absorbing strips 19, all signal light will be incident exactly between these strips. In this way no signal light will be lost but a large part of the ambient light will be absorbed. Thus, an image having a relatively high contrast can be obtained. The closer the focal lines of the cylindrical lenses 21 are located proximate to the front surface 17, the smaller said width w and the wider the light-absorbing strips 19 may be and the better the contrast of the projected image.

Moreover, the projection screen 5 may be provided with a Fresnel lens 27 at the rear surface 15. This Fresnel lens 27 has a converging effect and forms an image of the exit pupil of the projection lens system 11 in the audience space.

In the present invention the front surface 17 of the screen 5 is provided with diffusing means before the light-absorbing strips are provided, which diffusing strips are implemented as a single element diffusing hologram which diffuses light incident thereon into the horizontal direction as well as the vertical direction. Such a diffusing hologram may be made in the way as described in the article "Holographic Diffusers for LCD Backlights and Projection Screens" by J. M. Tedesco et al. in SID 93 Digest, pp. 29–32. The diffusing strips 29 are the portions of said hologram between the light-absorbing strips 19.

A holographic diffuser is obtained by means of an object beam emitted by a conventional diffuser. In principle, the holographic diffuser is an image of a speckle pattern obtained with an optical interference system in which conventional scattering diffusers are incorporated. The geometry of the holographic pick-up device may be chosen to be such that the speckle pattern obtained has different structures in two mutually perpendicular directions. When reconstructing the hologram thus obtained, thus when illuminating the holographic diffuser with signal light, this light is subjected to different diffusions in said two directors based on diffraction in accordance with the different structures of the speckle pattern in these directions.

It is to be noted that the hologram may be a computer-generated hologram instead of a hologram obtained by means of interfering laser beams.

Since the area in an audience space in which the audience is present is much larger in the horizontal direction than in the vertical direction, the angles at which light is diffused in these directions should be different. In practice, a diffusion of between, for example −40° and +40° is desired in the horizontal direction, whereas the desired diffusion in the vertical direction is between, for example −10° and +10°.

The signal light concentrated on the diffusing strips 29 by the cylindrical lenses 21 is thus diffused in the horizontal direction through a first angle and in the vertical direction through a second angle which is different from the first angle.

The holographic diffusing means may be implemented in different manners.

A first possibility is to implement the diffusing means as a replica of a surface relief hologram. A surface relief hologram is understood to mean a hologram in which the interference pattern is fixed in the form of a height relief of a surface. In a photosensitive layer which is provided, for example on a metal plate, an interference pattern is made by means of interfering laser beams, which pattern yields a height relief on the plate after developing and etching. This height relief may be reproduced a large number of times on an equally large number of projection screens. The diffusing hologram is thus made only once as a mold and subsequently replicated. Replica techniques suitable for this purpose are, for example injection molding, pressing or UV replication. In UV replication the surface of a transparent plate on which the interference structure must be arranged is provided with a liquid lacquer coating. The side of the mold provided with the structure is pressed into the lacquer layer. Subsequently the lacquer layer is illuminated with UV light, for example through the transparent plate so that the lacquer layer is cured and the mold can be removed.

A second possibility is to implement the diffusing means as a volume hologram. In such a hologram a three-dimensional interference pattern in the form of refractive index variations throughout the layer thickness is written into, for example a photopolymeric layer or a dichromatic gelatin. Such a hologram has a smooth surface so that it is relatively simple to provide the light-absorbing strips on this surface. In this case the hologram itself instead of a replica is directly provided on the screen.

In known projection screens the cylindrical lenses 21 have a light-spreading function. Particularly when they spread light in the horizontal direction, the cylindrical lenses 21 should be relatively powerful and the transparent plate should be relatively thin to ensure a sufficiently large spread of light. Since the cylindrical lenses 21 do not have a light-spreading function in a given direction in the present invention, but serve only to concentrate the signal light in given strips, it is sufficient to use relatively weak lenses so that the plate may be thicker. This contributes to the stability of the screen. Moreover, the cylindrical lenses may extend in the vertical direction as well as in the horizontal direction as long as the light-absorbing strips extend in the same direction.

The cylindrical lenses 21 may be provided, for example on the plate 13 by means of a replica process in which a mold is copied in a deformable material as described in, for example U.S. Pat. No. 4,566,756. The plate 13 is provided with a layer of synthetic material, for example PMMA or polycarbonate which may cure under the influence of heat, ultraviolet radiation or by cooling. Subsequently, a mold having a structure which is complementary to the lens structure to be formed is pressed into the synthetic material layer. The synthetic material is then cured and the mold is removed.

Subsequently, the diffusing means 29 may be provided on the front surface 17, as described hereinbefore.

If the diffusing means are implemented as a surface relief hologram, the screen 5 is preferably entirely made of a curable synthetic material. The starting material will then be a sufficiently thick layer of synthetic material in a soft state, which material is optically transparent in the cured state. This synthetic material is then enclosed at the rear surface 15 by the mold having the cylindrical lens structure, while the mold with the surface relief hologram is present at the front surface 17. After curing, the two molds are removed and the light-absorbing strips 19 can subsequently be provided on the front surface 17.

The light-absorbing strips 19 may be provided on the front surface 17 of the plate 13 by means of, for example a photographic process. First, a photoresist is provided on the front surface, strips of which are illuminated at the area of the strips to be blackened. There will be no photosensitive material left at these areas after developing and rinsing. Subsequently, the complete surface is blackened, whereafter the non-illuminated photoresist can be removed and a pattern of black strips is left.

If the surface 17 is formed in such a way that the strips 19 extend higher than the narrow strips 29 in which the signal light is concentrated, the strips 19 can be blackened by using a rolling or pressing technique using black ink or a coating technique using black synthetic material.

What is claimed is:

1. A rear projection screen in the form of an optically transparent plate having a rear surface and a front surface opposite thereto, the front surface being for projecting an image toward an audience space; said plate comprising:

a structure of juxtaposed substantially parallel cylindrical lenses on said rear surface extending in a substantially vertical direction, said lenses focusing light incident thereon into a series of substantially parallel beams incident on said front surface and extending in said substantially vertical direction;

diffusing means on said front surface constituted by a unitary element in the form of a diffusing hologram; and a series of substantially parallel strips of light absorbing material overlying said hologram and extending in said substantially vertical direction, there being interleaved spaces between said strips wherein portions of said hologram are exposed to said beams;

the exposed portions of said hologram constituting a series of substantially parallel holographic diffusing strips on said front surface extending in said substantially vertical direction and aligned with said beams, each of said diffusing strips subjecting the beam with which it is aligned to angular diffusion in both said substantially vertical direction and a substantially horizontal direction, the diffusing angles in said two directions being different from each other.

2. The rear projection screen as claimed in claim 1, further wherein at the front surface of the plate the widths in the horizontal direction of each light beam coming from the cylindrical lenses are substantially equal to the widths of the holographic diffusing strips opposite to said lenses.

3. An image projection device comprising an image display screen and a system for modulating a radiation beam in accordance with an image to be formed on said display screen, wherein said display screen is a rear projection screen as claimed in claim 1.

4. The rear projection screen as claimed in claim 1, wherein the hologram is a replica of a recorded surface relief pattern.

5. The rear projection screen as claimed in claim 1, wherein the hologram is formed in a volume phase material.

6. The rear projection screen as claimed in claim 1, wherein the beams formed by the cylindrical lenses are focussed thereby in the interleaved spaces between the light-absorbing strips and at or proximate to the front surface of said plate.

7. An image projection device as claimed in claim 3, further comprising a Fresnel lens at the rear surface of said display screen.

* * * * *